(12) United States Patent
Black et al.

(10) Patent No.: US 7,024,426 B2
(45) Date of Patent: Apr. 4, 2006

(54) RATIONALIZATION OF DATA USED IN MODEL OF TIME VARYING EVENT BEHAVIOR

(75) Inventors: Michaela M Black, Co Londonderry (GB); Raymond J Hickey, Antrim (GB)

(73) Assignee: British Telecommunications public limited company, London (GB)

( * ) Notice: Subject to any disclaimer, the term of this patent is extended or adjusted under 35 U.S.C. 154(b) by 315 days.

(21) Appl. No.: 10/129,623

(22) PCT Filed: Dec. 1, 2000

(86) PCT No.: PCT/GB00/04597

§ 371 (c)(1),
(2), (4) Date: May 9, 2002

(87) PCT Pub. No.: WO01/43060

PCT Pub. Date: Jun. 14, 2001

(65) Prior Publication Data

US 2002/0183999 A1 Dec. 5, 2002

(30) Foreign Application Priority Data

Dec. 9, 1999 (EP) .................................. 99309922

(51) Int. Cl.
*G06F 17/00* (2006.01)
(52) U.S. Cl. ..................... 707/104.1; 706/20
(58) Field of Classification Search ............. 707/102, 707/100, 104.1; 706/16, 15, 20, 45, 47, 12, 706/13

See application file for complete search history.

(56) References Cited

U.S. PATENT DOCUMENTS

| 5,899,992 A | * | 5/1999 | Iyer et al. ....................... 707/7 |
| 6,067,535 A | * | 5/2000 | Hobson et al. ................ 706/10 |
| 6,161,130 A | * | 12/2000 | Horvitz et al. .............. 709/206 |
| 6,301,579 B1 | * | 10/2001 | Becker ........................ 707/102 |
| 6,304,864 B1 | * | 10/2001 | Liddy et al. .................. 706/15 |

FOREIGN PATENT DOCUMENTS

| EP | 0426423 A2 | 10/1990 |
| WO | WO 98/24230 | 6/1998 |
| WO | WO 99/05844 | 2/1999 |

OTHER PUBLICATIONS

Black, "Incremental Learning for Data Mining", A Literature Review, Dec. 1997.

* cited by examiner

*Primary Examiner*—Uyen Le
(74) *Attorney, Agent, or Firm*—Nixon & Vanderhye P.C.

(57) ABSTRACT

A method for rationalization of data used to model a time-variant behavior provides advantages in that storage requirements for such data are reduced and accuracy of detection of events in the behavior is increased. The method uses labels added to training data to indicate whether that data relates to recent events or not. A classifier is generated from the labelled training data. By removing old data which the classifier would classify differently were the old data re-labelled as new, a selective purging of the old training data takes place each time new training data becomes available. The method is especially useful in detecting fraudulent use of, or faults in, a communications network.

15 Claims, 7 Drawing Sheets

| Source Area Code | Dest'n Country Code | Dest'n Area Code | Duration (min) | Charge Rate (p per min) | Day | Time | O.K.? |
|---|---|---|---|---|---|---|---|
| (a) | (b) | (c) | (d) | (e) | (f) | (g) | (h) |
| 1622 | 44 | 1622 | 10.25 | 1 | 7 | 10.23 | L |
| 2077 | 82 | 5601 | 48.35 | 30 | 7 | 13.58 | L |
| 1473 | 1 | 202 | 22.10 | 12 | 4 | 11.56 | L |
| 1245 | 44 | 1603 | 1.45 | 20 | 3 | 14.35 | L |
| 1248 | 44 | 1256 | 45.40 | 30 | 2 | 16.23 | L |
| 1753 | 44 | 1707 | 26.85 | 30 | 1 | 17.48 | L |
| 1179 | 55 | 2303 | 55.00 | 45 | 6 | 13.37 | F |
| 1203 | 44 | 1203 | 15.65 | 1 | 7 | 18.23 | L |
| 1610 | 44 | 1610 | 21.75 | 1 | 7 | 08.30 | L |
| 1658 | 44 | 1658 | 8.75 | 1 | 7 | 09.45 | L |
| 1912 | 44 | 1688 | 6.20 | 30 | 2 | 14.15 | L |

Fig.4.

| Source Area Code | Dest'n Country Code | Dest'n Area Code | Duration (min) | Charge Rate (p per min) | Day | Time | O.K. ? |
|---|---|---|---|---|---|---|---|
| (a) | (b) | (c) | (d) | (e) | (f) | (g) | (h) |
| 1226 | 44 | 1484 | 1.40 | 30 | 2 | 14.35 | L |
| 2084 | 44 | 1483 | 8.85 | 30 | 4 | 13.47 | L |
| 1223 | 44 | 1223 | 28.90 | 1 | 7 | 08.27 | L |
| 2076 | 72 | 203 | 66.30 | 60 | 6 | 20.55 | F |
| 131 | 44 | 191 | 4.60 | 30 | 2 | 18.53 | L |
| 1611 | 44 | 1611 | 23.35 | 1 | 7 | 11.56 | L |
| 1633 | 44 | 1705 | 5.00 | 20 | 1 | 19.58 | L |
| 1635 | 44 | 1635 | 35.40 | 1 | 7 | 18.28 | L |
| 1588 | 31 | 222 | 27.55 | 22 | 5 | 09.32 | L |
| 1502 | 44 | 1502 | 18.75 | 1 | 7 | 08.50 | L |
| 1878 | 44 | 1758 | 9.20 | 30 | 3 | 13.34 | L |

Fig.5.

| Source Area Code | Dest'n Country Code | Dest'n Area Code | Duration (min) | Charge Rate (p per min) | Day | Time | O.K.? | Training Status |
|---|---|---|---|---|---|---|---|---|
| (a) | (b) | (c) | (d) | (e) | (f) | (g) | (h) | (i) |
| 1622 | 44 | 1622 | 10.25 | 1 | 7 | 10.23 | L | extant |
| 2077 | 82 | 5601 | 48.35 | 30 | 7 | 13.58 | L | extant |
| 1473 | 1 | 202 | 22.10 | 12 | 4 | 11.56 | L | extant |
| 1245 | 44 | 1603 | 1.45 | 20 | 3 | 14.35 | L | extant |
| 1248 | 44 | 1256 | 45.40 | 30 | 2 | 16.23 | L | extant |
| 1753 | 44 | 1707 | 26.85 | 30 | 1 | 17.48 | L | new |
| 1633 | 44 | 1705 | 5.00 | 20 | 1 | 19.58 | L | new |
| 1635 | 44 | 1635 | 35.40 | 1 | 7 | 18.28 | L | new |
| 1588 | 31 | 222 | 27.55 | 22 | 5 | 09.32 | L | new |
| 1502 | 44 | 1502 | 18.75 | 1 | 7 | 08.50 | L | new |
| 1878 | 44 | 1758 | 9.20 | 30 | 3 | 13.34 | L | new |

RATIONALIZATION OF DATA USED IN MODEL OF TIME VARYING EVENT BEHAVIOR

This application is the U.S. national phase of international application PCT/GB00/04597 filed 1 Dec. 2000 which designated the U.S.

BACKGROUND

1. Field of the Invention

The present invention relates to a method of rationalising data stored in a physical form.

It has particular utility in relation to rationalising data that reflects a time-variant behaviour.

2. Related Art

In many cases, in order to model a time-variant behaviour it is necessary to gather training data over the course of time. Normally, the training data comprises a plurality of examples, each of which provides values of a plurality of parameters, which values characterise that example. The examples reflect the time-variant behaviour that is to be modelled.

Usually, a time-variant behaviour is modelled by running a computer program which controls the computer to output predicted values of one of the predicted parameters given an incomplete example that only provides values for the other parameters. Where the parameter whose value is being sought takes a few discrete values (or falls within one of a few discrete value ranges) then the model can be said to provide a classification of the incomplete example.

Conventionally, one of two approaches is used in gathering data over the course of time in order to model a time-variant behaviour.

Firstly, data can simply be accumulated over time. The disadvantage of this approach is that after any change in the time-variant behaviour the training data includes examples that reflect aspects of the time-variant behaviour that no longer subsist. The resulting increase in the proportion of the training data which is no longer applicable leads to the training data reflecting the time-variant behaviour less accurately. This results in any models that are produced on the basis of the training data also becoming less accurate.

Secondly, existing training data can be frequently replaced by training data relating to more recent events. However, if the behaviour that is being modelled includes rare events that are of interest (as is the case in relation to fraudulent calls, or failed calls in telephone networks, for example) then the paucity of data relating to such events results in the model being unsatisfactorily inaccurate.

The skilled person has therefore, up until the advent of the present invention, been faced with a trade-off. On the one hand, if he or she accumulates training data over time then models based on the training data lack adaptability. On the other hand, if he or she frequently replaces the training data then the accuracy of the model is limited.

BRIEF SUMMARY

According to a first aspect of the present invention, there is provided a method of rationalising training data stored in a physical form, wherein said training data comprises an extant set of training examples, each member of said extant set providing values for a newness parameter and one or more other parameters, the value of said newness parameter indicating that the event to which that training example relates occurred before a predetermined time;

said method comprising the steps of:

gathering an update set of training examples, each member of said update set providing values for said newness parameter and said one or more other parameters, the value of said newness parameter indicating that the event to which that training example relates occurred after said predetermined time;

analysing said extant set and said update set to generate a classifier which is able to classify training examples from both said extant set and said update set, the classification of the training examples being dependent on the value of said newness parameter; and on the basis of the generated classifier, selecting a surviving set of training examples from said extant set.

By generating a classifier which is able to classify training examples on the basis of whether they occurred before or after a predetermined time, and then using that classifier to remove only selected extant training examples, extant training examples which relate to aspects of the time-variant behaviour that ceased before the predetermined time are removed whereas as those that relate to behaviours that subsisted after the predetermined time remain.

In comparison to known methods of accumulating training data over time, the removal of training data that is no longer relevant after a change in the time-variant behaviour means that less storage capacity is required for the training data.

In comparison to the frequent replacement of training data, the maintenance of training data that is still relevant despite a change in the time-variant behaviour means that the detection or prediction of events in the time-variant behaviour is improved.

Preferably, said method further comprises the steps of:

generating said extant set by gathering training examples by adding a newness parameter value to each of a first set of incomplete extant examples, each of which provides values for said one or more other parameters, said newness parameter value indicating that said examples relate to events that occurred before said predetermined time;

generating said update set by adding a newness parameter value to each of a second set of incomplete update examples, each of which provides values for said one or more other parameters, said newness parameter value indicating that said examples relate to events that occurred after said first predetermined time.

This enables the method to be used on data that does not include time parameters.

In preferred embodiments, the method further comprises the steps of:

combining said surviving set and said update set to provide a purged set of one or more training examples; and removing the newness parameter value from each member of said purged set to generate an incomplete purged set of one or more incomplete training examples.

This has the advantage that the storage capacity required for the data is reduced still further.

The method of the invention can be repeated each time that training data reflecting recent changes in the time-variant behaviour becomes available. Accordingly, in some embodiments of the present invention, the method further comprises the steps of:

adding a newness parameter value to each of said incomplete training examples of said purged set, which newness parameter value indicates that said examples relate to events that occurred before a second predetermined time, thereby forming a new set of training examples;

repeating steps according to the first aspect of the present invention, treating said new set of training examples as said extant set, and said second predetermined time as said predetermined time.

Many different types of classifiers may be used in the present invention. In preferred embodiments, said classifier generation step comprises:

analysing said training data to generate representations of logical rules, each of which rules comprises one or more criteria relating to respective ones of said one or more other parameters and a corresponding conclusion, one or more of said rules including a newness criterion which is met for those examples in which the value of said newness parameter indicates that said event occurred after said first predetermined time; and said surviving set forming step comprises:

identifying a subset of said logical rules that include a requirement that said newness criterion is not met as outdated rules; and removing at least some of those training examples which meet all the criteria of one or more of said outdated rules.

The use of a rule-based classifier provides a straightforward method for selecting data which would be classified differently were the value of their newness parameter to be altered to indicate that they relate to an event which occurred before said predetermined time. That results in a reduction in the processing power required to implement the invention.

In some embodiments, said removal step comprises removing all of those training examples which meet all the criteria of one or more of said outdated rules.

The extant training examples that would be classified differently were the value of their newness parameter to be altered to indicate that they relate to an event which occurred before said predetermined time will form a subset of the extant training examples which the classifier classifies using outdated rules. By removing all such extant training examples, it follows that the subset is removed, together with some other training examples. Although this method is less selective than those of the first set of preferred embodiments mentioned below, it is less complex and hence requires less processing power to implement it.

In a first set of preferred embodiments, said surviving set forming step further comprises:

identifying rules having a requirement that said newness requirement is met as new rules;

generating rationalised new rules by removing said newness criterion;

identifying rules having no newness criterion as surviving rules;

forming an up-to-date set of rules by combining said surviving rules and said new rules;

classifying said training example into a first class on the basis of said outdated rules; and classifying said training example into a second class on the basis of said up-to-date rules;

removing said training example from said extant set if said first and second classes differ.

In this first set of preferred embodiments, instead of removing all those training examples that conform with outdated rules, only a selection of those training examples are removed. This is found to be better able to remove only those training examples that reflect aspects of the time-variant behaviour that have ceased.

In preferred embodiments of the present invention, said logical rules are arranged as a decision-tree. Preferably, the tree-building algorithm uses a criteria selection heuristic which chooses at each stage the locally most informative attribute. This might be based on the entropy or any number of different information measures. As will be understood by those skilled in the art, placement of relevant (i.e. informative) criteria high in the tree facilitates the removal of those criteria that are least informative by so-called 'post pruning' of the tree.

This has the advantage that the position of the newness criterion in the decision tree allows the method to distinguish easily between variations in the data that merely represent random variations in the time-variant behaviour and those variations that represent a significant change in the time-variant behaviour.

The method of the present invention can be incorporated into a method of classifying an unclassified example. Any classifier may be generated using the rationalised training data. However, in a particularly advantageous embodiment of this aspect of the present invention, said method of classifying an unclassified example comprises generating a purged set of training examples in accordance with one of the above-mentioned first set of preferred embodiments of the present invention and classifying said unclassified example using said up-to-date rules.

In this way the amount of processing power used in generating the classifier is reduced.

Other aspects of the present invention are defined in the claims.

BRIEF DESCRIPTION OF THE DRAWINGS

There now follows, by way of example only, a description of specific embodiments of the present invention. This description refers to the accompanying drawings, in which.

DETAILED DESCRIPTION OF EXEMPLARY EMBODIMENTS

Figure 1:
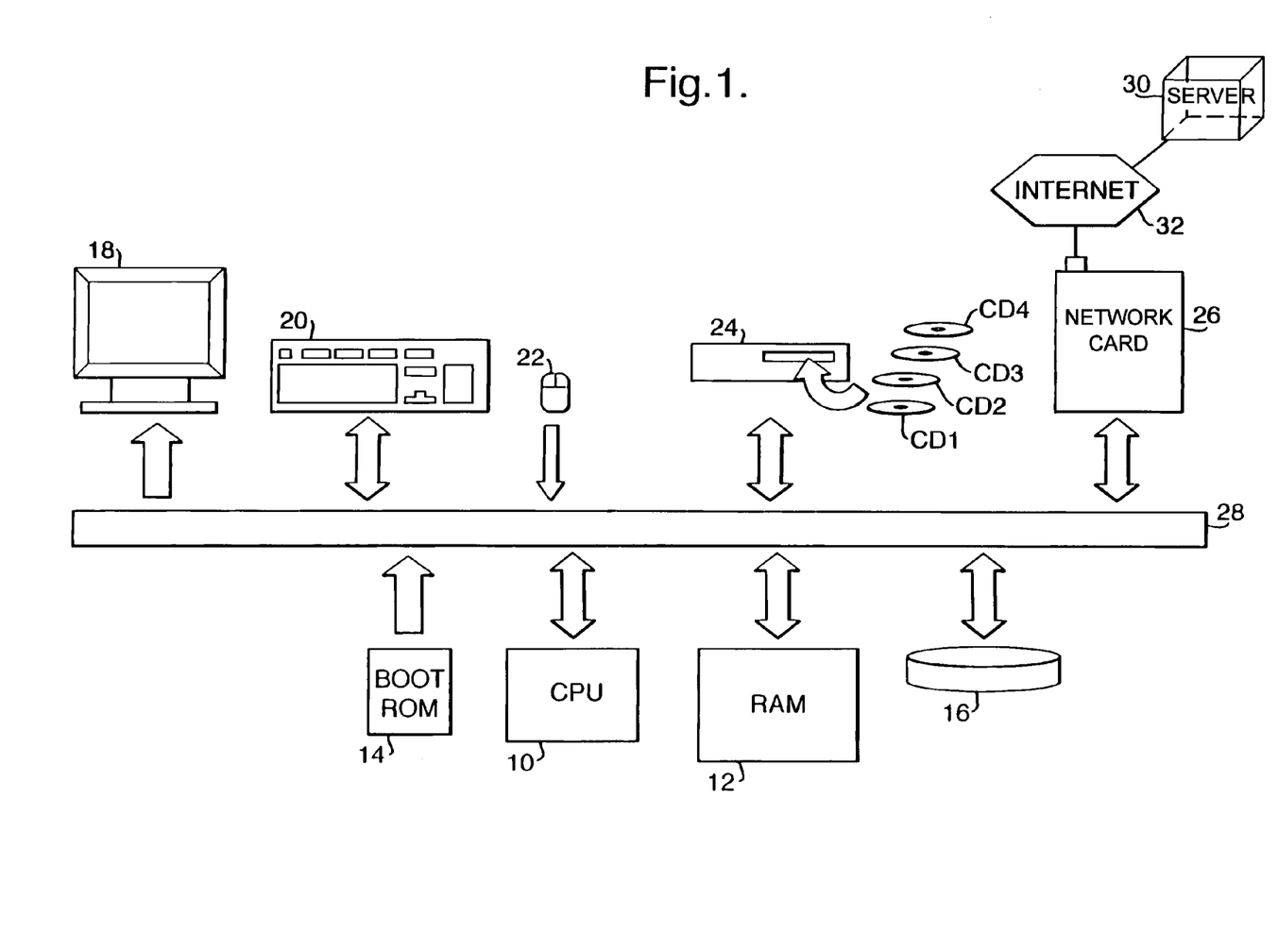
FIG. 1 is a schematic illustration of components of a personal computer which may be operated to provide a call entry classifier in accordance with first and second embodiments of the present invention.

FIG. 1 shows a personal computer which comprises well-known hardware components connected together in a conventional manner. The well-known hardware components comprise a central processing unit 10, random access memory 12, read-only memory 14, a hard-disc 16 and input/output devices 18,20,22,24, and 26. The hardware components are interconnected via one or more data and address buses 28. The input/output devices comprise a monitor 18, a keyboard 20, a mouse 22, a CD ROM drive 24 and a network card 26. The network card is connected to a server computer 30 by the public Internet 32.

In accordance with a first embodiment of the present invention, a user uses the computer to analyse data concerning recent calls made by customers of a telecommunication network operator and thereby to identify a subset of those calls which are more likely to be fraudulent than the remainder. By identifying those calls that are more likely to be fraudulent, the network operator can investigate those calls and more effectively prevent future occurrences of similar frauds.

The user begins by loading a program from a compact disc CD1 into the computer's RAM 12 and running that program.

Figure 2:
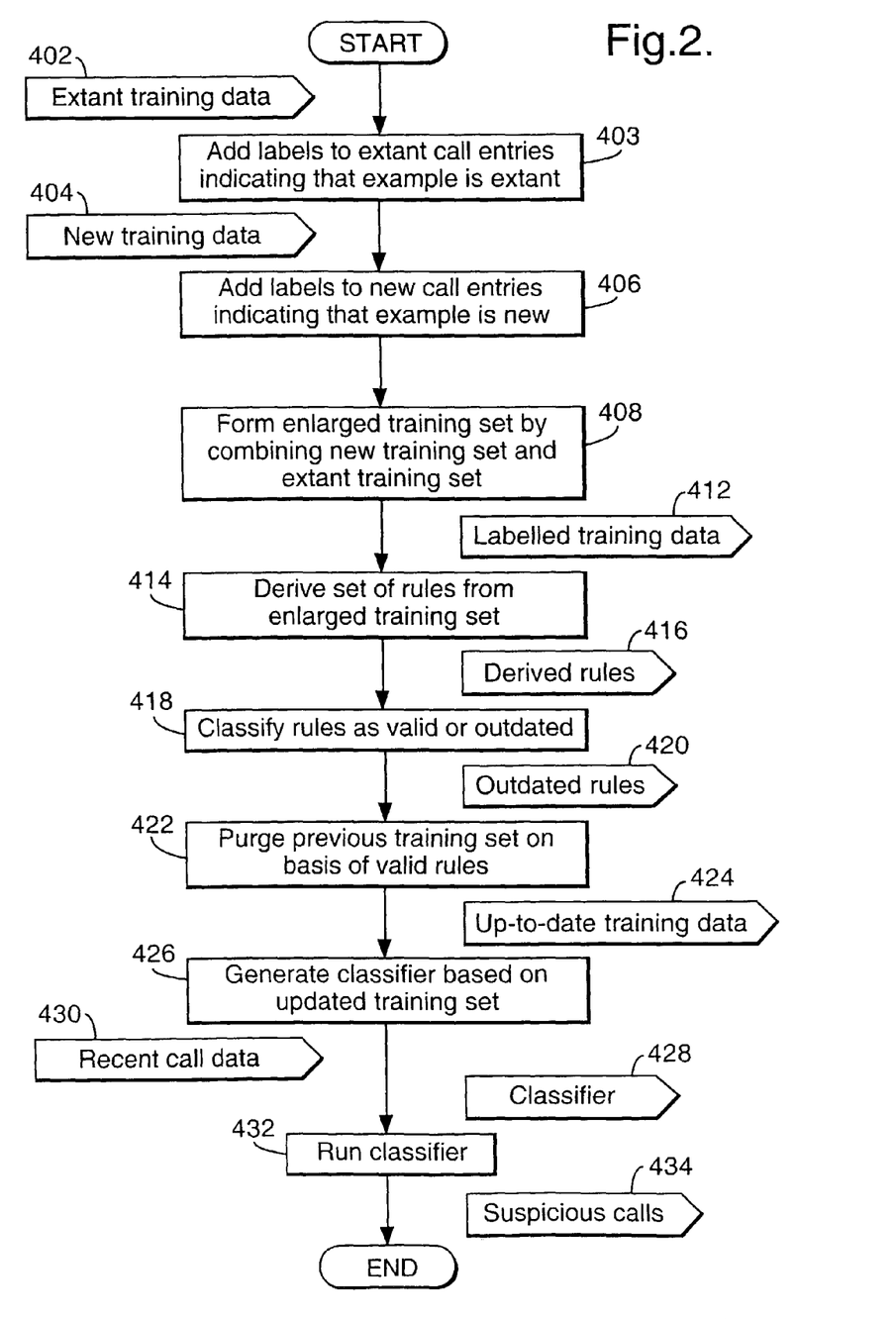
FIG. 2 is a flow chart showing the steps undertaken in classifying call entries in a call data file as suspicious or unsuspicious in accordance with first and second embodiments of the present invention.
Figure 3:
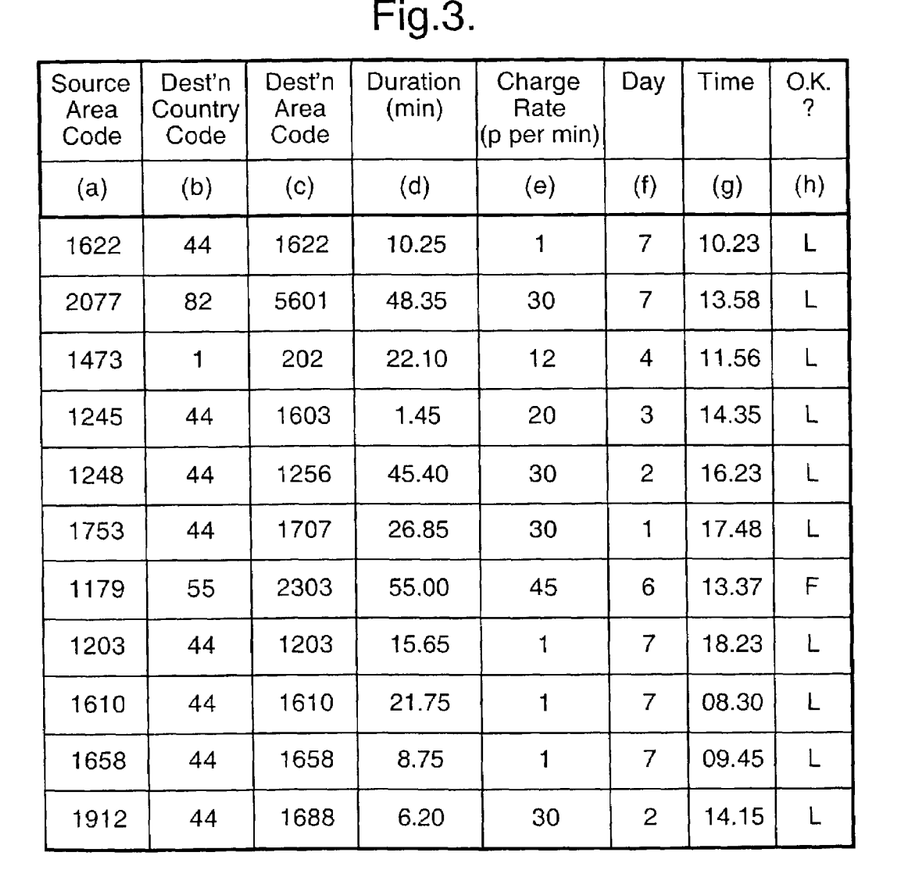
FIG. 3 shows a few call entries from a file containing extant training data.
Figure 4:
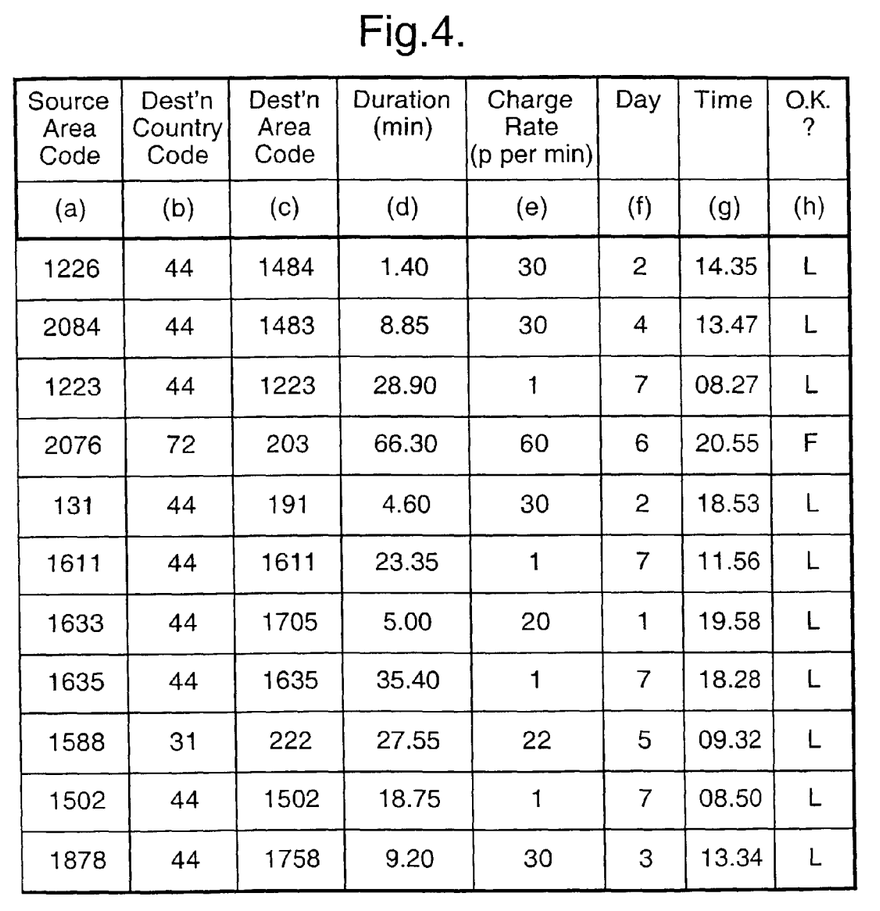
FIG. 4 shows a few call entries from a file containing new training data.

The steps of the method for identifying calls that are likely to be fraudulent which are carried out by the computer under control of that program are set out in FIG. 2. The program first prompts the user to load an extant training data file 402 from a compact disc CD2 into the computer's RAM 12. The extant training data file 402 contains a set of call entries relating to calls that are already known to be fraudulent or legitimate, all of which relate to calls made before, for example, February 1999. As is illustrated in FIG. 3 (which shows a few examples of call entries in the extant training data file 402), each call entry in the data file gives a number of parameters associated with a call made by a customer. Those parameters include:
a) the area code for the source of the call;
b) the country code for the destination of the call;
c) the area code for the destination of the call;
d) the duration of the call in minutes;
e) the rate at which the customer was charged for the call;
f) the day of the week that the call was made;
g) the time of day that the call was made; and
h) a flag indicating whether the call was legitimate or fraudulent.

In step 403, the computer is controlled by the program to add a training status label to each of the call entries in the pre-February 1999 training data file 402 to indicate that the call entry is 'extant'.

Thereafter, the computer prompts the user to load a new training data file 404 (this might for example contain details of calls made during, say, February 1999) from a third compact disc CD3 into the RAM 12. This compact disc contains a plurality of call entries of a similar format to the call entries in the pre-February 1999 training data file 402.

Then in step 406, the computer is controlled by the program to add a training status label to each of the call entries in the February 1999 training data file 404 indicating that the call entry is 'new'.

Figure 5:
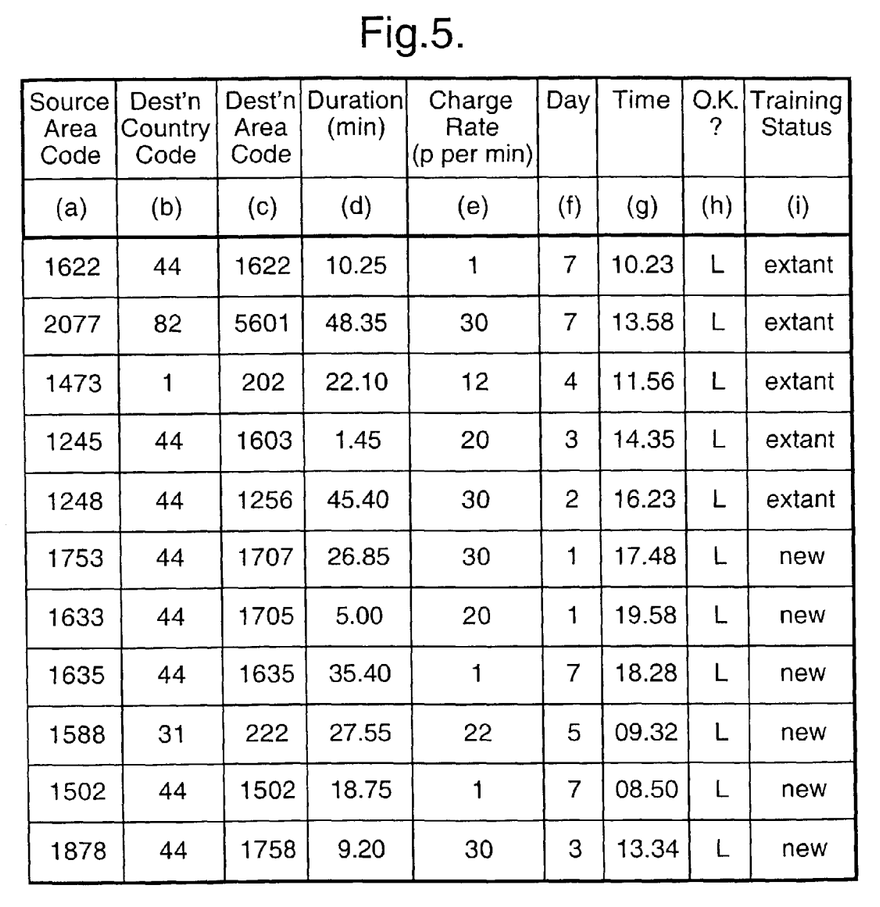
FIG. 5 shows a few call entries from a file containing labelled training data, each call entry being labelled with its training status.

The computer then merges (step 408) the pre-February 1999 and February 1999 training data files together to form a labelled pre-March 1999 training data file 412. Some examples of call entries in the labelled file are shown in FIG. 5. It will be seen that, in addition to each of the call parameters (a) to (h) mentioned above, each call entry includes a 'Training status' label (i).

Then, the computer generates, based on the labelled pre-March 1999 training data file 412, a set of rules contained in a rules file 416. As is known to those skilled in the art, each of these rules comprises a set of criteria and a likely conclusion if those criteria are satisfied. In the present example, the rules give a conclusion as to whether a call is suspicious or unsuspicious based on one or more criteria which are dependent upon respective call parameters a) to h).

Those skilled in the art will be able to write and run a suitable rule-generation program, but could alternatively use a commercially available program. For example, the user might purchase the See5 data analysis program from Rule-Quest Research Pty Ltd, 30 Athena Avenue, St Ives NSW 2075, Australia. Alternatively, the program can be downloaded in a known manner by running a browser program on the computer, browsing the file found on the www at rulequest dot com, and then following the hyperlinks as instructed.

Thus, the computer generates a derived rules file 416 from the labelled pre-March 1999 training data file.

For example, given the labelled pre-March 1999 training data file 412, the computer running under the control of the program might output the following set of rules.
Rule 1: IF dest'n country code is (44) THEN call is UNSUSPICIOUS;
Rule 2: IF dest'n country code is NOT (44) AND duration is (<30 min) THEN call is UNSUSPICIOUS;
Rule 3: IF dest'n country code is NOT (44) AND call duration is NOT (<30 min) AND training status is (new) AND dest'n country code is (72) THEN call is SUSPICIOUS;
Rule 4: IF dest'n country code is NOT (44) AND call duration is NOT (<30 min) AND training status is (new) AND dest'n country code is NOT (72) THEN call is UNSUSPICIOUS;
Rule 5: IF dest'n country code is NOT (44) AND call duration is NOT (<30 min) AND training status is (extant) AND dest'n country code is (55) THEN call is SUSPICIOUS;
Rule 6: IF dest'n country code is NOT (44) AND call duration is NOT (<30 min) AND training status is (extant) AND dest'n country code is NOT (55) THEN call is UNSUSPICIOUS.

In step 418, the program controls the computer to select the rules which include the criterion 'training status is (extant)'. In the above example, rules 5 and 6 are therefore selected. Each of the selected rules then has the criterion 'training status is (extant)' removed to provide an outdated rule. The outdated rules are then stored in an outdated rules file 420. In the present case, the outdated rules file 420 would contain the following outdated rules:
Outdated Rule 1: IF dest'n country code is NOT (44) AND call duration is NOT (<30 min) AND dest'n country code is (55) THEN call is SUSPICIOUS;
Outdated Rule 2: IF dest'n country code is NOT (44) AND call duration is NOT (<30 min) AND dest'n country code is NOT (55) THEN call is UNSUSPICIOUS.

Figure 6:
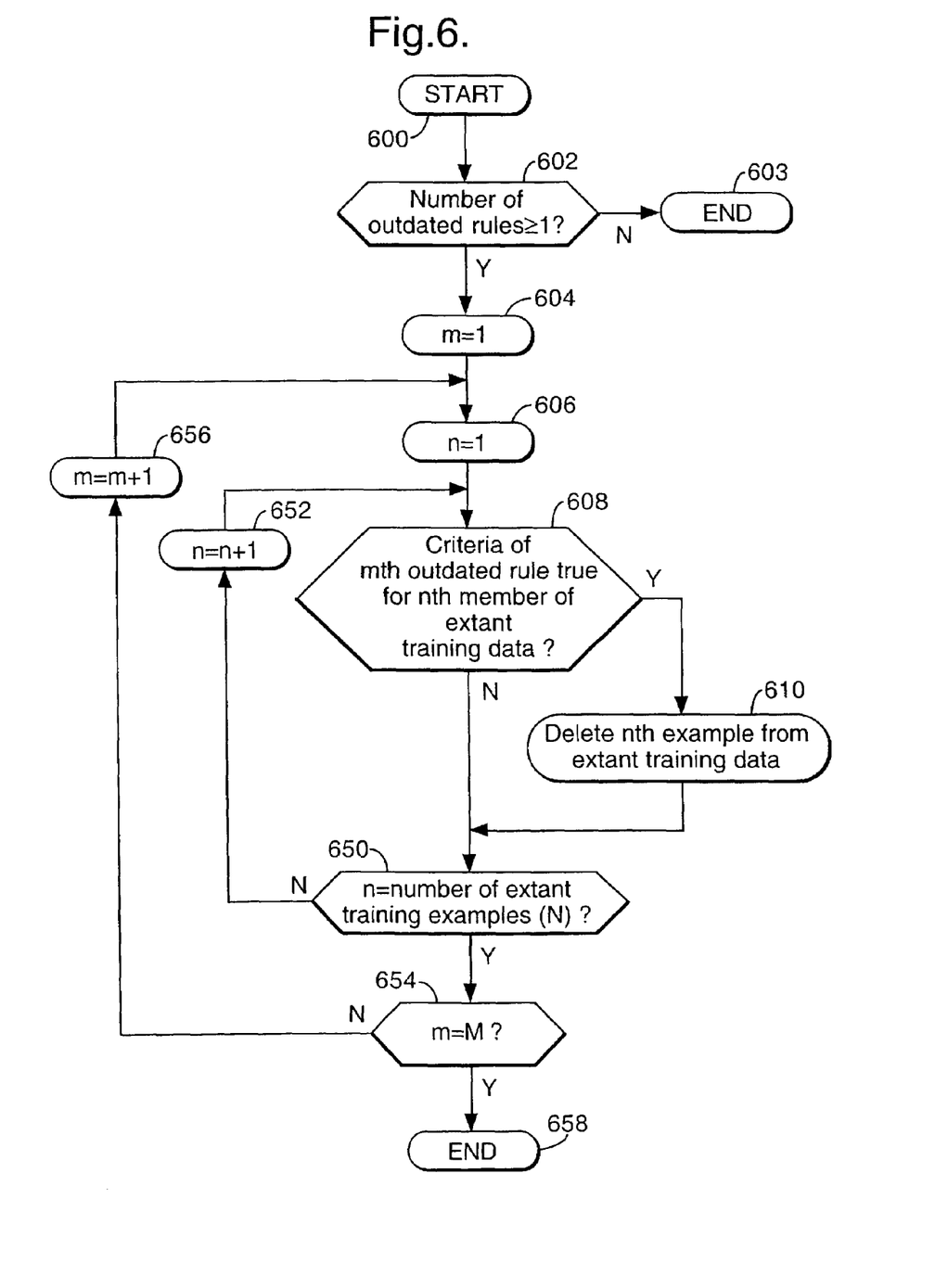
FIG. 6 is a flow chart showing the purging step of the method of FIG. 2 carried out in accordance with a first embodiment of the present invention.

In step 422 the pre-February 1999 training data file 402 is processed to remove call entries which meet all the criteria (i.e. all the conditions before the word 'THEN') of one or more of the outdated rules. In more detail, a flow chart illustrating the steps which the computer undertakes in order to purge the pre-February 1999 training data file 402 in accordance with a first embodiment of the present invention is shown in FIG. 6.

Firstly, in step 602, the computer is controlled to check whether there are any outdated rules in the outdated rules file 420. If there are no outdated rules, then the purging step 422 ends at step 603.

If there are one or more outdated rules then, at step 604, an outer loop counter (m) is initialised to one. An outer group of operations (606–654) are then carried out.

The outer group of instructions begins with the setting of an inner loop counter (n) to one (step 606).

Thereafter, an inner group of instructions (608, 610, 650) is carried out. The inner group of instructions begins with a test (step 608) to establish whether every one of the one or more criteria of the mth rule in the outdated rule file 420 is true for the nth call entry in the extant training data file 402. If all those criteria are true for the nth call entry, then that call entry is deleted in step 610 (without altering the number n associated with the call entries that follow it). If the mth outdated rule does not provide a conclusion for the rule entry then that call entry is maintained in the pre-February 1999 training data file 402. Following the deletion or maintenance of the nth call entry, an inner loop termination test (step 650) is carried out to see whether the nth call entry in the pre-February 1999 training data file is the last call entry. If it is not then n is incremented by one in step 652 and the inner group of instructions (608, 610, 650) is repeated.

When the inner loop termination test (step 650) finds that the last call entry has been reached, an outer loop termination test (step 654) is then carried out.

The outer loop termination test (step 654) finds whether the outer loop counter is equal to the number of rules (M) contained in the outdated rules file 420. If the loop counter is not yet equal to the number of rules (M) contained in the outdated rules file 420 then the outer loop counter m is incremented by one (step 656) and the outer group of instructions (606–654) is repeated for the following outdated rule.

When the loop counter does reach the number of rules (M) contained in the outdated rules file 420 then the purging process 422 ends (step 658).

After the purging process 422, the remaining call entries are processed to remove the training status (i) and thereby to form an updated pre-March 1999 training data file 424.

The user can then execute any known classifier generation program on the computer to provide a classifier 428 based on the pre-March updated training data file 424. By way of example, the classifier generation program might be based on decision tree algorithms (e.g. the See5 program mentioned above), or neural net algorithms. Since the updated pre-March 1999 training data file does not contain training status data, if the classification step 426 produces a set of rules, then those rules will not contain any criteria relating to the training status of the examples.

Having generated the classifier the user can then load incomplete February 1999 call data 430 from CD4. The incomplete February 1999 call data contains call entries for which it is not known whether the entry relates to a legitimate call or not. The user then runs the classifier (step 432) to create a file of suspicious call entries (434) containing identifiers of recent calls that should be regarded as suspicious and hence subjected to further investigation.

It will be seen that the amount of the training data that must be stored in order to enable the computer to generate a classifier in step 426 is less than the total contents of the extant training data file 402 and the new training data file 404. Furthermore, despite the reduction in training data, it will be realised that the accuracy of the classifier generated in step 426 is not significantly reduced in the absence of a change in the fraudulent use of the network in February 1999. However, if such a change were to occur then the above embodiment avoids the significant degradation in performance that would result from using all the pre-February 1999 and February 1999 data.

In another embodiment, the program controls the computer to classify each of the examples in the incomplete February 1999 call data 430 using a modified set of the valid rules produced in the rule derivation step 414. The rules are modified by removing any criteria which relate to the training status parameter. Thus, in the above example, the modified set of valid rules would be:

Valid Rule 1: IF dest'n country code is (44) THEN call is UNSUSPICIOUS;

Valid Rule 2: IF dest'n country code is NOT (44) AND duration is (<30 min) THEN call is UNSUSPICIOUS;

Valid Rule 3 (modified): IF dest'n country code is NOT (44) AND call duration is NOT (<30 min) AND dest'n country code is (72) THEN call is SUSPICIOUS;

Valid Rule 4 (modified): IF dest'n country code is NOT (44) AND call duration is NOT (<30 min) AND dest'n country code is NOT (72) THEN call is UNSUSPICIOUS.

This has the further advantage that the processing necessary to generate the classifier in step 426 is substantially reduced.

Figure 7:
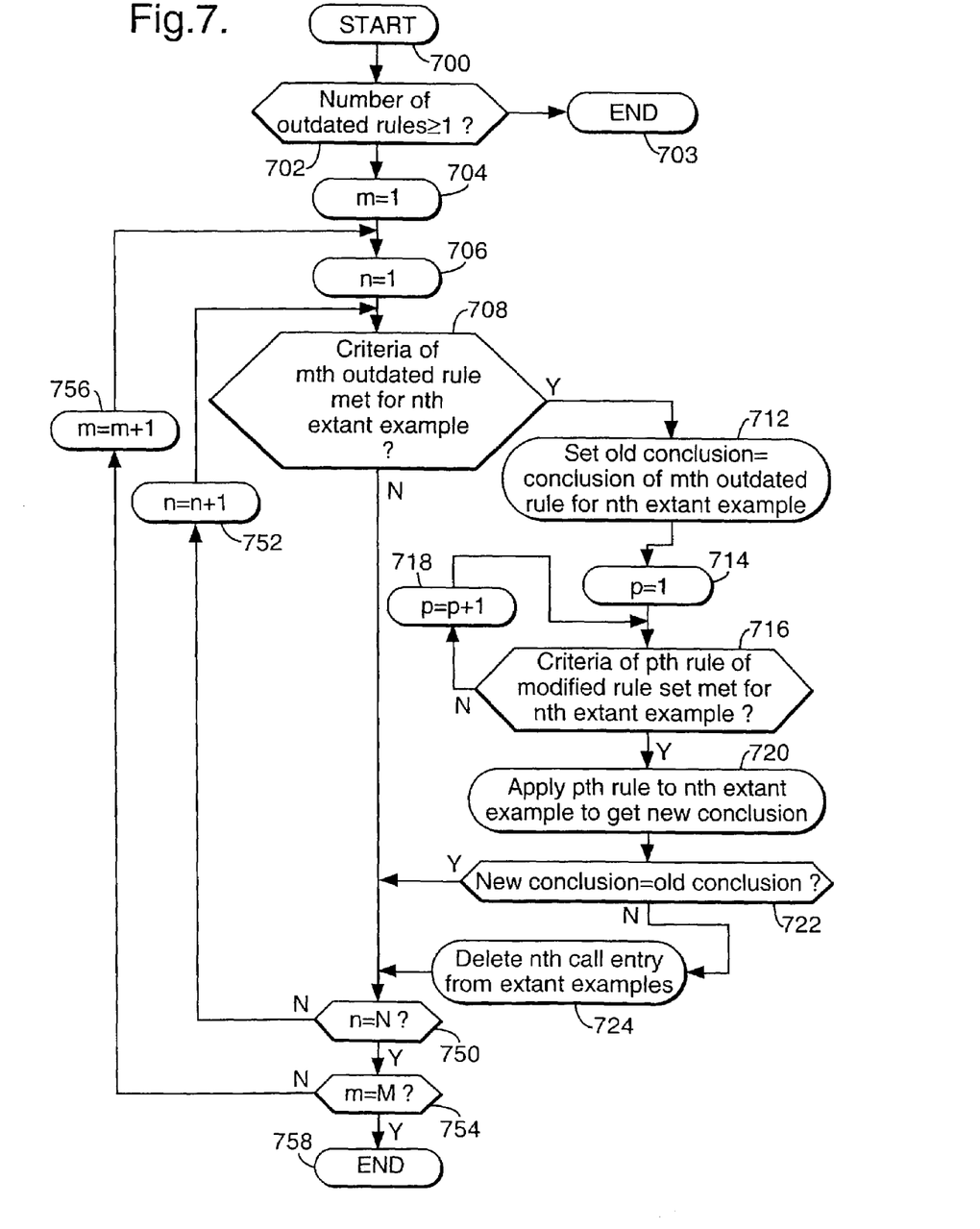
FIG. 7 is a flow chart showing the purging step of the method of FIG. 2 carried out in accordance with a second embodiment of the present invention.

In yet another embodiment of the present invention, a similarly modified set of valid rules is produced in step 418, the purging step 422 then being carried out in the manner illustrated in FIG. 7.

Firstly, in step 702, the computer is controlled to check whether there are any outdated rules in the outdated rules file 420. If there are no outdated rules, then the purging step 422 ends at step 703.

If there are one or more outdated rules then, at step 704, an outermost loop counter (m) is initialised to one.

An outermost group of operations (706–756) are then carried out.

The outermost group of instructions begins with the setting of an intermediate loop counter to one (step 706).

This is followed by the carrying out of an intermediate group of instructions (708–752) which begins with a test (step 708) to establish whether every one of the one or more criteria of the mth rule in the outdated rule file 420 is true for the nth call entry. If the criteria of the mth outdated rule do apply to the nth call entry then a call entry handling routine (steps 712 to 724) is carried out.

Otherwise, an intermediate loop termination test (step 750) is carried out to find whether the intermediate loop counter equals the number of call entries in the pre-February 1999 data file. If it does not, then the intermediate loop counter (n) is increased by one in step 552 and the innermost group of instructions is repeated.

On the other hand, if the intermediate loop termination test (step 750) finds that the intermediate loop counter does not yet equal the number of call entries in the pre-February 1999 data file, a further test is carried out. The further test involves testing whether the outermost group of instructions (706–752) has been carried out for each of the m outdated rules in the outdated rule file 420. If the outermost group of instructions has not been carried out for each outdated rule, then the outermost loop counter (m) is increased by one in step 756 and the outermost group of instructions (706–752) is repeated. If the outermost group of instructions has been carried out for each outdated rule, then the purging process ends (step 758).

The call entry handling routine (steps 712–724) mentioned above begins by storing the conclusion obtained by applying the mth outdated rule to the nth call entry (step 712).

An appropriate-valid-rule-identification routine (step 716, 718) then begins with the initialisation of an innermost loop counter (p) to one (step 714). This is followed by a test (step 716) to find whether it is true that every one of the criteria in the pth rule in the modified valid rules file is true for the nth call entry in the pre-February 1999 training data file 402. If true, the appropriate-valid-rule-identification routine (step 716, 718) ends. The innermost loop counter p is increased by one in step 718 and the appropriate-valid-rule-identification routine (steps 716,718) is repeated.

The routine finds in which of the rules in the modified valid rules file, all the criteria are true for the nth call entry in the pre-February 1999 training data 402. Thereafter, the conclusion of the rule is found and stored (step 720).

Once the new conclusion has been stored in step 720, the old conclusion (obtained in step 712) is compared to the new conclusion. If the two are the same, then the call entry is maintained in the labelled training data file 412. If the two are different then the call entry is deleted (step 724). In either case, the call entry handling routine then ends.

Once the process of FIG. 7 has been carried out, the training status labels are removed from the examples remaining in the labelled training data file 412 to provide an up-to-date training data file 424.

The process then continues as described in relation to the first embodiment.

The third embodiment is preferred to the first because it is found to produce training data which models a time-variant behaviour more accurately than does the training data produced by the first embodiment.

In a fourth embodiment of the present invention, labelled training data 412 is produced as it is in the above embodiments. Then, step 414 of the above method is replaced by the generation of a neural net which has the training status as one of its inputs and an output which indicates whether the call entry is to be regarded as suspicious or unsuspicious. The neural net is trained in a conventional manner using the labelled training data 412.

The labelled training data is then purged as follows. First, the classification predicted by the neural net for each labelled extant call entry is stored. Then the extant call entries are relabelled as 'new'. Again, the classification predicted by the neural net is found and stored. Only those extant call entries that are classified similarly in the two cases are recorded in the up-to-date training data 424.

The above embodiments will be of use in many applications. Nevertheless, they are especially useful in relation to some applications in which the detection of an event of a certain type will itself result in a change in the time-variant behaviour being investigated. For example, when used in the detection of fraudulent use of, or faults in, a communications network, the improved detection will result in a change in the time-variant behaviour being modelled (assuming the fraudulent use or fault will cease once detected).

What is claimed is:

1. A computer-implemented method for operating data processing apparatus to rationalize stored training data, said training data being suitable for generating a model of a time-valiant behavior wherein said training data includes an extant set of training examples, each member of said extant set providing values for a newness parameter and one or more other parameters, the value of said newness parameter indicating that the event to which that training example relates occurred before a predetermined time; said method comprising:

(a) gathering an update set of training examples, each member of said update set providing values for said newness parameter and said one or more other parameters, the value of said newness parameter indicating that the event to which that training example relates occurred after said predetermined time;

(b) analyzing said extant set and said update set to generate a classifier which classifies training examples from both said extant set and said update set, the classification of the training examples being a function of a plurality of parameters which include said newness parameter; and (c) forming a surviving set of training examples by selecting, on the basis of the generated classifier, a surviving set of training examples from said extant set.

2. A method as in claim 1 further comprising:

generating said extant set by gathering training examples by adding a newness parameter value to each of a first set of incomplete extant examples, each of which provides values for said one or more other parameters, said newness parameter value indicating that said examples relate to events that occurred before said predetermined time; and generating said update set by adding a newness parameter value to each of a second set of incomplete update examples, each of which provides values for said one or more other parameters, said newness parameter value indicating that said examples relate to events that occurred after said first predetermined time.

3. A method as in claim 1 further comprising combining said surviving set and said update set to provide a purged set of one or more training examples.

4. A method as in claim 3 further comprising removing the newness parameter value from each member of said purged set to generate an incomplete purged set of one or more incomplete training examples.

5. A computer-implemented method of classifying an unclassified example of time-variant behavior, said method comprising:

generating a purged set of training examples in accordance with claim 3;

generating a classifier based on said purged set of training examples; and classifying said unclassified example using said classifier.

6. A method as in claim 4 further comprising:

adding a newness parameter value to each of said incomplete training examples of said purged set, which newness parameter value indicates that said examples relate to events that occurred before a second predetermined time, thereby forming a new set of training examples; and repeating steps (a), (b) and (c) treating said new set of training examples as said extant set, and said second predetermined time as said predetermined time.

7. A method as in claim 1 wherein said forming step (c) comprises forming a surviving set of training examples which the generated classifier would classify in the same way were the value of said newness parameter to be changed to indicate that the event to which the example relates occurred after said predetermined time.

8. A method as in claim 1 wherein:

step (b) comprises analyzing said training data to generate representations of logical rules, each of which rules comprises one or more criteria relating to respective ones of said one or more other parameters and a corresponding conclusion, one or more of said rules including a newness criterion which is met for those examples in which the value of said newness parameter indicates that said event occurred after said first predetermined time and step (c) comprises identifying a subset of said logical rules that include a requirement that said newness criterion is not met as outdated rules; and removing at least some of those training examples which meet all the criteria of one or more of said outdated rules.

9. A method as in claim 8 wherein said removing sub-set of step (c) comprises removing all of those training examples which meet all the criteria of one or more of said outdated rules.

10. A method as in claim 8 wherein step (c) further comprises:
   identifying rules having a requirement that said newness requirement is met as new rules;
   generating rationalized new rules by removing said newness criterion;
   identifying rules having no newness criterion as surviving rules;
   forming an up-to-date set of rules by combining said surviving rules and said new rules;
   classifying said training example into a first class on the basis of said outdated rules;
   classifying said training example into a second class on the basis of said up-to-date rules; and
   removing said training example from said extant set if said first and second classes differ.

11. A method of classifying an unclassified training example, said method comprising:
   generating a purged set of training examples in accordance with claim 10 and
   classifying said unclassified example using said up-to-date rules.

12. A method as in claim 8 wherein said logical rules are arranged as a decision-tree.

13. Apparatus comprising an input device, memory, an output device, and a data processing unit, each of said devices being connected in operation to said data processing unit, wherein said memory stores:
   a) extant training data input code executable by said data processing unit to cause extant training data representations to be also represented at predetermined locations in said memory, said extant training data comprising a plurality of extant training examples, each extant training example providing values for a newness parameter and a set of one or more other parameters, the value of said newness parameter indicating that said event occurred before a predetermined time;
   b) update training data input code executable by said data processing unit to cause update training data representations presented to said input device to be also represented at further predetermined locations in said memory, said update training data comprising a plurality of update training examples, each update training example providing values for a newness parameter and a set of one or more other parameters, the value of said newness parameter indicating that said event occurred after a predetermined time;
   c) a classifier generation code executable by said data processing unit to generate a classifier which is able to classify training examples from both said extant set and said update set, the classification of the training examples being dependent on the value of one or more of said one or more other parameters and said newness parameter; and
   d) training data purging code executable by said data processing unit to remove from said extant training data at least some of those examples which the generated classifier would classify differently were the value of said newness parameter to be changed to indicate that the event to which the example relates occurred after said predetermined time.

14. A computer-implemented method of operating a data processing apparatus to process classifier training data to provide purged classifier training data, said data processing apparatus comprising an input device, an output device, memory and a data processing unit, said method comprising:
   storing training data in said memory, said training data comprising:
      (a) an extant set of training examples, each member of said extant set providing values for a newness parameter and one or more other parameters, the value of said newness parameter indicating that the event to which that training example relates occurred before a predetermined time; and
      (b) an update set of training examples, each member of said update set providing values for said newness parameter and said one or more other parameters, the value of said newness parameter indicating that the event to which that training example relates occurred after said predetermined time;
   operating said data processing unit to process said training data to generate a classifier which is able to classify training examples from both said extant set and said update set, the classification of the training examples being dependent on the value of one or more of said one or more other parameters and said newness parameter; and
   operating said data processing unit to remove from said extant set those training examples which the generated classifier would classify differently were the value of said newness parameter to be changed to indicate that the event to which the example relates occurred after said predetermined time.

15. A computer program product comprising a machine readable medium storing a computer program of instructions executable to perform method steps according to claim 1.

* * * * *